US009278322B2

(12) United States Patent
Kamiya

(10) Patent No.: US 9,278,322 B2
(45) Date of Patent: Mar. 8, 2016

(54) MIXER OF A ROTOR-STATOR TYPE, PERFORMANCE ESTIMATION METHOD THEREOF, AND SCALE UP METHOD THEREOF

(75) Inventor: Tetsu Kamiya, Odawara (JP)

(73) Assignee: MEIJI CO., LTD., Koutou-Ku, Tokyo (JP)

( * ) Notice: Subject to any disclaimer, the term of this patent is extended or adjusted under 35 U.S.C. 154(b) by 432 days.

(21) Appl. No.: 13/817,094

(22) PCT Filed: Oct. 18, 2010

(86) PCT No.: PCT/JP2010/068251
§ 371 (c)(1),
(2), (4) Date: May 10, 2013

(87) PCT Pub. No.: WO2012/023217
PCT Pub. Date: Feb. 23, 2012

(65) Prior Publication Data
US 2013/0226521 A1    Aug. 29, 2013

(30) Foreign Application Priority Data
Aug. 19, 2010  (JP) ................................ 2010-184464

(51) Int. Cl.
*B01F 5/16*    (2006.01)
*B01F 7/00*    (2006.01)
(Continued)

(52) U.S. Cl.
CPC ............. *B01F 7/00016* (2013.01); *A23L 1/296* (2013.01); *A23L 1/483* (2013.01); *B01F 5/104* (2013.01);
(Continued)

(58) Field of Classification Search
CPC .... B01F 7/0075; B01F 7/008; B01F 7/00808; B01F 7/00816; B01F 7/00833; B01F 7/164; B01F 5/104; B01F 2215/0404; B01F 2215/0409; B01F 5/165; G01M 13/00

USPC .................. 366/264, 302, 304, 305, 286
See application file for complete search history.

(56) References Cited

U.S. PATENT DOCUMENTS 1,873,199 A * 8/1932 Haskell ....................... 241/259.1
1,997,032 A * 4/1935 Alstad et al. ..................... 99/453
(Continued)

FOREIGN PATENT DOCUMENTS

EP    2745920 A4 *    7/2015    ................ B01F 5/10
JP    10-226981 A    8/1998
(Continued)

OTHER PUBLICATIONS

International Search Report (PCT/ISA/210) issued on Feb. 8, 2011, by the Japanese Patent Office as the International Searching Authority for International Application No. PCT/JP2010/068251.
(Continued)

*Primary Examiner* — Charles Cooley
(74) *Attorney, Agent, or Firm* — Buchanan Ingersoll & Rooney PC

(57) ABSTRACT

Herein is disclosed a comprehensive mixer performance estimation method that can be applied to the mixers of the rotor-stator type having various configurations and circulation systems. Specifically, the performance estimation method for the mixers of the rotor-stator type includes the steps of: obtaining the homogenization index: H.I. for each of the mixers, measuring the size of each of the mixers, the power requirements and flow rates during the running time of each of the mixers, estimating the magnitude (smallness or greatness) of the configuration dependent term value of each of the mixer as a whole which is specific to each of the mixers, and estimating the performance of each of the mixers accordingly.

12 Claims, 12 Drawing Sheets

(51) Int. Cl.
- *B01F 5/10* (2006.01)
- *B01F 7/16* (2006.01)
- *B01J 2/10* (2006.01)
- *G06F 17/00* (2006.01)
- *A23L 1/48* (2006.01)
- *A23L 1/29* (2006.01)

(52) U.S. Cl.
CPC ............... *B01F 5/165* (2013.01); *B01F 7/164* (2013.01); *B01J 2/10* (2013.01); *G06F 17/00* (2013.01); *B01F 2215/0404* (2013.01); *B01F 2215/0409* (2013.01)

(56) References Cited

U.S. PATENT DOCUMENTS

| | | | | |
|---|---|---|---|---|
| 2,169,339 | A | * | 8/1939 | Ditto .......................... 366/305 |
| 2,591,966 | A | * | 4/1952 | Rider ........................ 366/286 |
| 3,194,540 | A | * | 7/1965 | Hager ........................ 366/305 |
| 3,195,867 | A | * | 7/1965 | Mould, Jr. .................. 366/305 |
| 3,224,689 | A | * | 12/1965 | Behrens et al. ............ 241/244 |
| 3,514,079 | A | * | 5/1970 | Little, Jr. .................... 366/305 |
| 3,658,266 | A | * | 4/1972 | O'Keefe et al. ........... 241/101.2 |
| 3,982,700 | A | * | 9/1976 | Love ........................ 241/46.11 |
| 5,088,831 | A | * | 2/1992 | Reinhall .................... 366/171.1 |
| 5,902,042 | A | * | 5/1999 | Imaizumi et al. ......... 366/176.2 |
| 6,000,840 | A | * | 12/1999 | Paterson .................... 366/264 |
| 8,851,741 | B2 | | 10/2014 | Ganmor et al. ............ 366/171.1 |
| 8,911,141 | B2 | * | 12/2014 | Cheio De Oliveira et al. ........................ 366/164.6 |
| 8,960,993 | B2 | * | 2/2015 | Cheio De Oliveira et al. ............................. 366/139 |
| 2003/0152500 | A1 | * | 8/2003 | Dalziel et al. .............. 422/245.1 |
| 2004/0187770 | A1 | * | 9/2004 | Calabrese ................. A23J 3/16 117/200 |
| 2004/0242764 | A1 | | 12/2004 | Yamada et al. |
| 2005/0202095 | A1 | | 9/2005 | Daiziel et al. |
| 2011/0026358 | A1 | * | 2/2011 | Cheio De Oliveira et al. ............................. 366/139 |
| 2012/0093906 | A1 | * | 4/2012 | Ganmor et al. ............. 424/405 |
| 2013/0186970 | A1 | * | 7/2013 | Hagata .................... B01F 5/104 239/7 |
| 2013/0215711 | A1 | * | 8/2013 | Kamiya ..................... 366/343 |
| 2013/0218348 | A1 | * | 8/2013 | Kamiya ..................... 700/275 |
| 2013/0226521 | A1 | * | 8/2013 | Kamiya ..................... 702/182 |
| 2013/0315026 | A1 | * | 11/2013 | Cheio De Oliveira et al. ............................. 366/134 |
| 2014/0192614 | A1 | * | 7/2014 | Kamiya ..................... 366/302 |

FOREIGN PATENT DOCUMENTS

| | | |
|---|---|---|
| JP | 2000-218153 A | 8/2000 |
| JP | 2004-002732 A | 1/2004 |
| JP | 2005-506174 A | 3/2005 |
| JP | 2006-008852 A | 1/2006 |
| JP | 2008-229574 A | 10/2008 |

OTHER PUBLICATIONS

Tetsu Kamiya et al., "Scale-Up Factor for Mean Drop Diameter in Batch Rotor-Stator Mixers", Journal of Chemical Engineering of Japan, Apr. 2010, pp. 326-332, vol. 43, No. 4.

* cited by examiner

Fig.1 (--Prior Art--)
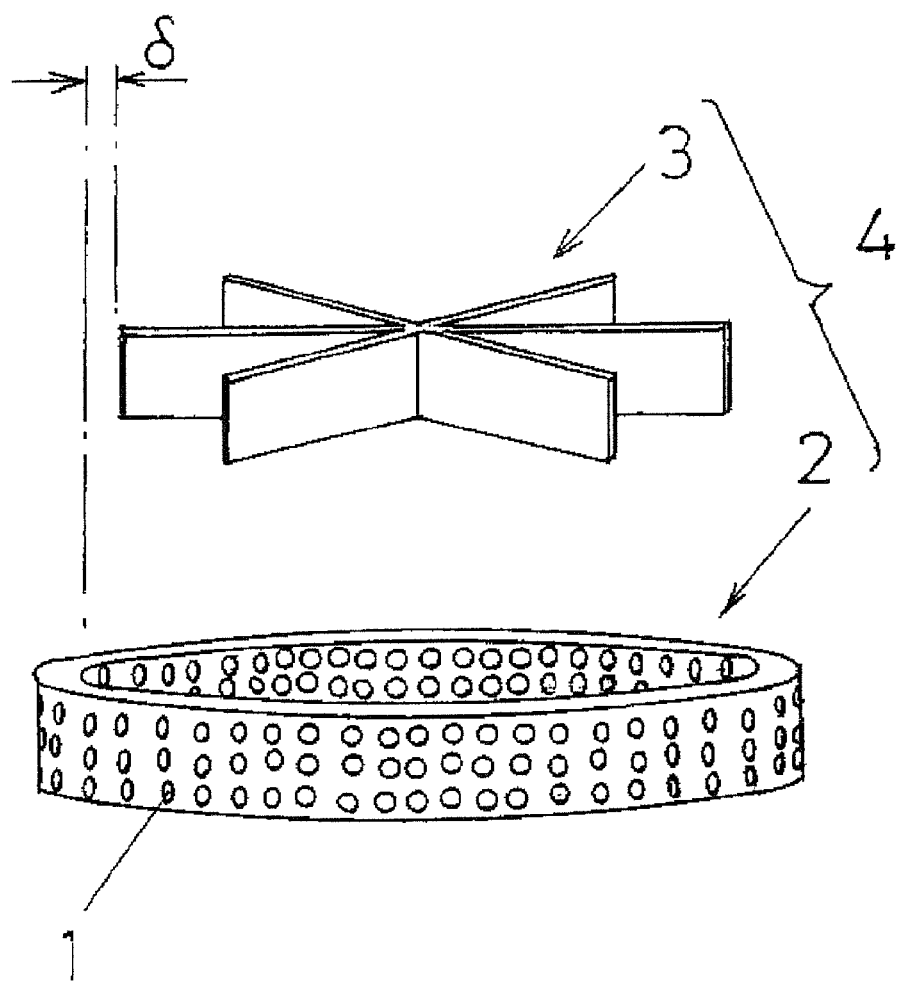

Fig.2 (--Prior Art--)
External Circulation
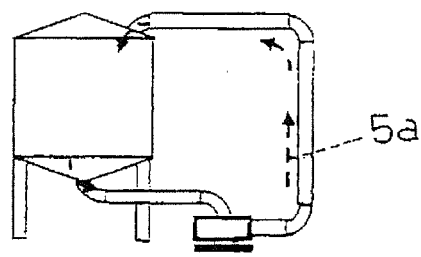
Internal Circulation
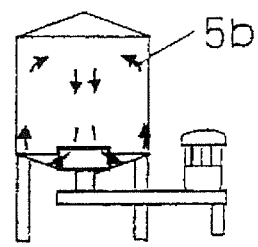

Fig.3 (--Prior Art--)
Mixer (Rotor-Stator Type)
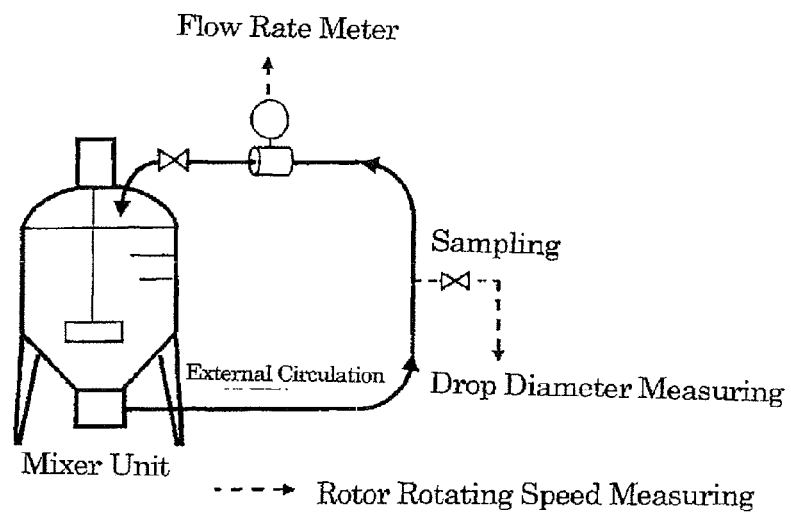
Fig.4 (--Prior Art--)
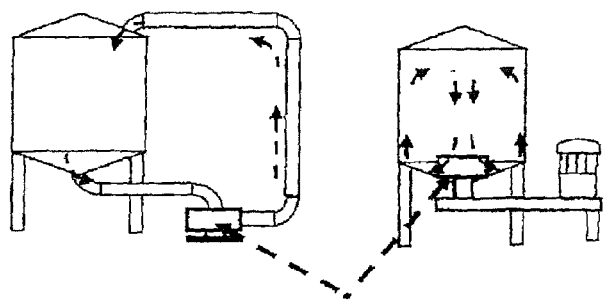
Mixer Units having Same Configuration ○ u = 27 m/s δ = 0.25 mm Lab    ● u = 27 m/s δ = 0.15 mm Lab
△ u = 21 m/s δ = 0.25mm Lab    ▲ u = 21 m/s δ = 0.15 mm Lab
□ u = 13 m/s δ = 0.25 mm Lab    ■ u = 13 m/s δ = 0.15 mm Lab
× u = 25 m/s δ = 0.25 mm MP10   + u = 20 m/s δ = 0.25 mm MP10

$d_{50} \propto H.I.^{-0.328}$, $R = 0.926$

MIXER OF A ROTOR-STATOR TYPE, PERFORMANCE ESTIMATION METHOD THEREOF, AND SCALE UP METHOD THEREOF

BACKGROUND

1. Technical Field

Generally, the present invention relates to mixers, and more specifically to a mixer of the so-called rotator-stator type that includes a stator having a plurality of openings or holes and a rotor that is disposed on the inner side of the stator and spaced by a particular gap away from the stator.

2. Background

As shown in FIG. 1, it is general that the mixer of the so-called rotor-stator type generally comprises a mixer unit 4 that includes a stator 2 having a plurality of openings (holes) 1 and a rotor 3 disposed on the inner side of the stator 2 and spaced by a particular gap δ from the stator 2. Such mixer of the rotor-stator type is provided for subjecting a fluid being processed to the emulsification, dispersion, particle size breakup, mixing or any other similar process, by taking advantage of the fact that a high shear stress may be produced in the neighborhood of a gap between the stator 3 rotating at high-speeds and the fixed stator 2. This mixer is used for mixing or preparing the fluid being processed, and has a wide variety of applications in which foods, pharmaceutical medicines, chemical products and others can be manufactured.

The mixer of the rotor-stator type may be classed according to the type of the circulation mode for the fluid being processed, that is, one being the externally circulated mixer in which the fluid liquid being processed may be circulated in the direction indicated by the arrow 5a in FIG. 2, and the other being the internally circulated mixer in which a liquid being processed may be circulated in the direction indicated by the arrow 5b in FIG. 2.

For the mixers of the rotor-stator type, many different configurations and circulation modes or systems have been proposed. For example, there is the Japanese patent application No. 2005-506174 in which the mixer of the rotor-stator type and the particle size breakup method are proposed, in which the mixer includes a stator having a plurality of openings (holes) and a rotor disposed on the inner side of the stator and spaced by a specific gap away from the stator. It is disclosed that the mixer may be used widely in the fields in the pharmaceutical medicines, nutrition supplement foods, other foods, chemical products, cosmetics and the like can be manufactured. It is also disclosed that the method disclosed enables the scale up function to be performed in the efficient, simple and easy manner.

In addition, for those past years, several indices (theories) have been reported as the performance estimation method for the mixers having the different configurations.

Not only for the mixer of the rotor-stator type as described above but also for all other type mixers, it is reported that, when the liquid-liquid dispersion operation in particular occurs, for example, the drop diameter size can be discussed in terms of the magnitude (smallness or greatness) of the values that can be obtained by calculating the average energy dissipation rate (Publications 1 and 2). In those publications 1 and 2, however, the method for calculating the average energy dissipation rates is not disclosed specifically.

The publications 3 to 6 report several study cases that may be applied to each individual mixer and in which the results obtained by the respective experiments have been organized into the tabular forms. In those study cases (Publications 3 to 6), however, it is considered that the mixer's particle size breakup function is only affected by the gap between the rotor and stator and by the openings (holes) on the stator. Only the information that is different for each different type mixer is reported.

Several study cases are reported (Publications 7 and 8), in which the particle size breakup mechanism for the mixer of the rotor-stator type was considered and discussed. In those publications 7 and 8, it is suggested that the energy dissipation rates of the turbulent flow will contribute to the particle size breakup effect, and the particle size breakup effect may be affected by the frequency (shear frequency) of the turbulent flow with which the particle size breakup effect is placed under the shear stress of the fluid being processed.

For the scale-up method for the mixer of the rotor-stator type, there are several reports (Publication 8) in which the final drop diameter (maximum stable drop diameter) can be obtained during the long-time mixer running period. This, however, is not practical in the actual production sites and is of no utility. Specifically, there are no reports regarding the study cases in which the processing (agitation and mixing) time of the mixer is the object for consideration, and those study cases are not useful enough to estimate the drop diameters that can be obtained during the particular mixer running period. Although it is reported that the drop diameters may be estimated by considering the mixer processing time, yet only the phenomenon (factual action) that is based on the actual measured values (experimental values) is reported. There are no study cases in which such phenomenon is analyzed theoretically.

The following publication, which is the document related to the patent application, is cited herein for reference:

Japanese Patent Application No. 2005-506174

The following publications, which are not related to the patent application, are cited herein for reference:

(1) David, J. T.; "Drop Sizes of Emulsions Related to Turbulent Energy Dissipation Rates", Chem. Eng. Sci., 40, 839-842 (1985) and David J. T.; "A Physical Interpretation of Drop Sizes in Homogenizers;

(2) Agitated Tanks, Including the Dispersion of Viscous Oils", Chem. Eng. Sci., 42, 1671-1676 (1987);

(3) Calabrese, R. V., M. K. Francis, V. P. Mishra and S. Phongikaroon; "Measurement and Analysis of Drop Size in Batch Rotor-Stator Mixer", Proc. 10th European Conference on Mixing, pp. 149-156, Delft, the Netherlands (2000);

(4) Calabrese, R. V., M. K. Francis, V. P. Mishra, G. A. Padron and S. Phongikaroon; "Fluid Dynamic and Emulsification in High Shear Mixers", Proc. 3rd World Congress on Emulsion, pp. 1-10, Lyon, France (2002);

(5) Maa, Y. F., and C. Hsu, and C. Hsu; "Liquid-Liquid Emulsification by Rotor/Stator Homogenization", J. Controlled. Release, 38, 219-228 (1996);

(6) Barailler, F., M. Heniche and P. A. Tanguy; "CFD Analysis of a Rotor-Stator Mixer with Viscous Fluids", Chem. Eng. Sci., 61, 2888-2894 (2006);

(7) Utomo, A. T., M. Baker and A. W. Pacek; "Flow Pattern, Periodicity and Energy Dissipation in a Batch Rotor-Stator Mixer", Chem. Eng. Res. Des., 86, 1397-1409 (2008);

(8) Porcelli, J.; "The Science of Rotor-Stator Mixers", Food Process, 63, 60-66 (2002);

(9) Urban, K.: "Rotor-Stator and Disc System for Emulsification Processes", Chem. Eng. Technol., 29, 24-31 (2006)

SUMMARY OF THE INVENTION

In the patent application cited above, the superiority (performance) of the particular mixer and the value range of the design on which the mixer is based are disclosed, but the theoretical grounds on which the value range of the high-performance mixer design is based are not described. The kinds and configurations of the high performance mixer are not described specifically.

It may be appreciated from the above description that, for those past years, several indices (theories) have been reported as the performance estimation method for the mixers having the different configurations. In most cases, however, those indices can only be applied to the individual mixers having the same configuration. In the actual cases, however, they cannot be applied to the mixers of the various types having the different configurations.

As noted above, there are almost no study cases in which the performance estimation method and the scale-up method for those mixers of the rotor-stator type have been defined. There are also no study cases in which those methods can be applied to the mixers of the various types having the different configurations, and the data on the results obtained by the experiments on such study cases have not been organized properly and comprehensively.

For the performance estimation method and scale-up method for the mixers of the rotor-stator type according to the prior art, in most cases, the final drop diameters (maximum stable drop diameters) were obtained by using the small scale device for each individual mixer and permitting the device to run for the long time period, and were then estimated. More specifically, in the prior art, there is no estimation method that can be used to estimate the drop diameters that would be obtained by using the large-scale devices (actual production installation) for the mixers of the various types and permitting such large-scale devices to run during the particular time period, or there is no estimation method that can be used to estimate the particular drop diameters obtained during the particular running time or the processing or agitating time required until such particular drop diameters can be obtained.

For the above reasons, the performance estimation method and design (development and fabrication) method for the mixers were actually performed on the trial and error basis by using the actually used processing liquids.

It is, therefore, objects of the present invention to provide a comprehensive performance estimation method that is established so that it can be applied to the mixers of the various types having the various configurations that are likely to be affected mostly by the gap in particular between the rotor and stator or the mixers of the various types having the different circulation systems; to provide the design method that is established by taking the running conditions (processing time) for such mixers into consideration; and to provide the manufacturing method (particle size breakup method) that is established to be used for manufacturing the foods, pharmaceutical medicines and the like by using the above described performance estimation method and design method.

A first aspect of the invention is characterized by the fact that the mixer of the rotor-stator type comprises a mixer unit that includes a stator having a plurality of openings (holes) and a rotor that is disposed on the inner side of the stator and spaced by a particular gap away from the stator, wherein when a fluid being processed by the mixer is subjected to the emulsification, diffusion, particle size breakup, mixing or any other similar process, the Equation 1 below is calculated so that a particular drop diameter for the fluid being processed by the mixer can be obtained during a particular mixer running time, and the mixer is thus designed by estimating the particular mixer running time and the drop diameters thus obtained for the fluid being processed.

$$H.I. = \frac{P_h}{\rho v_h} \frac{Q}{V} t_m \qquad \text{the Equation 1}$$

$$= \left( \frac{N_{qd}(N_p - \pi^2 \cdot N_{qd})d^8}{\pi \cdot h \cdot \delta(\delta + d) + \frac{\pi}{4} n_s dl} \right) \left( \frac{N^4 \cdot t_m}{V} \right)$$

$$= C_h \left( \frac{N^4 \cdot t_m}{V} \right)$$

In the Equation 1,
H.I: Homogenization Index [$m^2/s^3$]
$\rho$: Concentration [$kg/m^3$]
vh: Volume of the Gap [$m^3$]
$P_h$: Power Consumption [W]
Q: Flow Rate [$m^3/s$]
$t_m$: Mixing Time [s]
V: Fluid being Processed [$m^3$]
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
$\sigma$: Gap between Rotor and Stator [m]
N: Number of Rotations [1/s]
$C_n$: Configuration Dependent Term for Gap [$m^5$]

In a second aspect of the invention, the mixer is characterized by the fact that the stator and the rotor are arranged in such a manner that they can be moving closer to and or moving farther away from each other in the direction in which the rotary shaft of the rotor extends.

In a third aspect of the invention, the mixer is characterized by the fact that the mixer includes a plurality of stators each having a different circumferential diameter and a rotor disposed on the inner side of each of the plurality of stators and spaced by a particular gap away from each of the stators.

In a fourth aspect of the invention, the mixer is characterized by the fact that the fluid being processed is introduced into the gap between the stators and the rotor disposed on the inner side of each of the stators and spaced by the gap away from each of the stators.

In a fifth aspect of the invention, the mixer is characterized by the fact that the rotor has a plurality of agitating blades extending radially from the center of rotation.

A sixth aspect of the invention is characterized by the fact that the method for estimating the performance of the mixer of the rotor-stator type comprising a mixer unit that includes a stator having a plurality of openings (holes) and a rotor disposed on the inner side of the stator and spaced by a particular gap away from the stator is provided, wherein the method for estimating the performance of the mixer includes the steps of: using the Equation 1 below to determine the homogenization index: H.I, measuring the respective sizes of the rotor and stator and the power requirements and flow rates during the mixer running time period which are included in the Equation 1 below, and estimating the magnitude (smallness or greatness) of the values of the configuration depending term in the gap, which are specific to each of the mixers of the different types.

$$H.I. = \frac{P_h}{\rho v_h} \frac{Q}{V} t_m \qquad \text{the Equation 1}$$

-continued
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1,
H.I: Homogenization Index $[m^2/s^3]$
$\rho$: Concentration $[kg/m^3]$
vh: Volume of the Gap $[m^3]$
$P_h$: Power Consumption [W]
Q: Flow Rate $[m^3/s]$
$t_m$: Mixing Time [s]
V: Fluid being Processed $[m^3]$
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
$\sigma$: Gap between Rotor and Stator [m]
N: Number of Rotations [1/s]
$C_n$: Configuration Dependent Term for Gap $[m^5]$ A seventh aspect of the invention is characterized by the fact that a method for scaling-up or scaling down the mixer of the rotor-stator type comprising a mixer unit that includes a stator having a plurality of openings (holes) and a rotor disposed on the inner side of the stator and spaced by a particular gap away from the stator is provided, wherein the method includes the steps of: using the Equation 1 below to calculate the values of the homogenization index: H.I on the experimental mixer installation and/or on the pilot plant mixer installation, and matching the values of the homogenization index: H.I. thus obtained against the values for the homogenization index: H.I. obtained on the actual mixer installation that is specifically intended for scaling up or scaling down the mixer so that the former H.I. values can conform with the latter H.I. values.

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1,
H.I: Homogenization Index $[m^2/s^3]$
$\rho$: Concentration $[kg/m^3]$
vh: Volume of the Gap $[m^3]$
$P_h$: Power Consumption [W]
Q: Flow Rate $[m^3/s]$
$t_m$: Mixing Time [s]
V: Fluid being Processed $[m^3]$
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
$\sigma$: Gap between Rotor and Stator [m]
N: Number of Rotations [1/s]
$C_n$: Configuration Dependent Term for Gap $[m^5]$ An eighth aspect of the invention is characterized by the fact that foods, pharmaceutical medicines or chemical products are manufactured by subjecting the fluid being processed to the emulsification, dispersion, particle size breakup, mixing or any other like process that occurs by using the mixer of the rotor-stator type comprising the mixer unit that includes the stators each having the plurality of openings (holes) and the rotor disposed on the inner side of each of the stators and spaced by the particular gap away from each of the stators, wherein the foods, pharmaceutical medicines or chemical products are manufactured by subjecting the fluid being processed to the emulsification, dispersion, drop breakup, mixing or any other like process by using the Equation 1 below and estimating the mixer running time and the drop diameters that are thus obtained during the mixer running time.

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1
H.I: Homogenization Index $[m^2/s^3]$
$\rho$: Concentration $[kg/m^3]$
vh: Volume of the Gap $[m^3]$
$P_h$: Power Consumption [W]
Q: Flow Rate $[m^3/s]$
$t_m$: Mixing Time [s]
V: Fluid being Processed $[m^3]$
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
$\sigma$: Gap between Rotor and Stator [m]
N: Number of Rotations [1/s]
$C_n$: Configuration Dependent Term for Gap $[m^5]$ A ninth aspect of the invention is characterized by the fact that the method for manufacturing foods, pharmaceutical medicines or chemical products by subjecting the fluid being processed to the emulsification, dispersion, particle size breakup, mixing or any other like process that occurs by using the mixer of the rotor-stator type comprising the mixer unit that includes the stator having the plurality of openings (holes) and the rotor disposed inside the stator and spaced by the particular gap away from the stator, wherein the method includes the steps of: using the Equation 1 below, estimating the mixer running time and the drop breakup diameters thus obtained by the calculating step during the mixer running time, and manufacturing the foods, pharmaceutical medicines or chemical products based upon the estimating step.

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$

-continued $$= C_h\left(\frac{N^4 \cdot t_m}{V}\right)$$

In the Equation 1,
H.I: Homogenization Index [m²/s³]
ρ: Concentration [kg/m³]
vh: Volume of the Gap [m³]
$P_h$: Power Consumption [W]
Q: Flow Rate [m³/s]
$t_m$: Mixing Time [s]
V: Fluid being Processed [m³]
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
σ: Gap between Rotor and Stator [m]
N: Number of Rotations [1/s]
$C_n$: Configuration Dependent Term for Gap [m³]

In the present invention, the index that is called the homogenization index: H.I is utilized. The homogenization index that may be applied to each of the mixers of the various types having the different configurations and circulation systems that are offered from each of the manufacturers can be calculated separately from the geometrical sizes, running powers and flow rates that are specific to the rotor and stator. The homogenization index may be expressed by separating the values of the configuration dependent term from the values of the running condition dependent term, both of which terms are specific to the gap for each individual mixer.

When the performance for each individual mixer is estimated by the values for the homogenization index: H.I., for example, when the mixer performance is estimated by the particle size breakup trend, the magnitude (smallness or greatness) of the values for the configuration dependent term as measured in the mixer gap can be used.

When each individual mixer is to be scaled up or scaled down, the measured values of the homogenization index: H.I., as coupled with the values of the configuration dependent term and running condition dependent term that are specific to the mixer gap may be used, and each individual mixer can be designed by matching the values of H.I. against the respective values of the above terms so that the former H.I. value can conform with the latter term values.

Based upon the discoveries described above, the mixer that provides the higher particle size breakup and emulsification efficiencies than any of the prior art mixers can be developed and designed as the high performance mixer theoretically and experimentally.

In the present invention, specifically, the value range for the high performance mixer can be specified in terms of the values of the configuration depending term (factor) in the mixer gap, and can be applied to the performance estimation method for each individual mixer. In order to derive the values for the homogenization index: H.I., the present invention proposes the equation that allows the value range not covered by any of the prior art (conventional) mixers to be established in terms of the values for the configuration depending terms (factors) in the mixer gap that may be obtained by using the above proposed equation. According to the present invention, the value range that cannot be calculated easily by using the prior art index (theory) or is difficult to be obtained unless it is measured actually can be established.

According to the method for manufacturing the foods, pharmaceutical medicines or chemical products by subjecting the fluid being processed to the emulsification, dispersion, particle size breakup or mixing process that occurs by using the mixer of the rotor-stator type, the particular mixer running time and the drop diameters thus obtained during the particular running time for the fluid being processed can be estimated by calculating the homogenization index using the Equation proposed by the present invention, and the foods, pharmaceutical medicines or chemical products having the desired drop diameters can thus be manufactured.

BRIEF DESCRIPTION OF DRAWINGS

FIG. 1 is a perspective view illustrating a mixer unit that is included in the mixer of the so-called rotor-stator type;

FIG. 2 illustrates the mixer of the rotor-stator type that runs in the external circulation mode (the externally circulated mixer) and the mixer of the rotor-stator type that runs in the internal circulation mode (the internally circulated mixer), FIG. 3 illustrates the mode in which the particle size breakup trend for the drop diameters can be investigated;

FIG. 4 illustrates the mode in which the experimental results on the mixer of the rotor-stator type that runs in the external circulation mode (the externally circulated mixer) can be used to estimate the performance of the mixer of the rotor-stator type that runs in the internal circulation mode (the internally circulated mixer);

BEST MODE OF EMBODYING THE INVENTION

Figure 5:
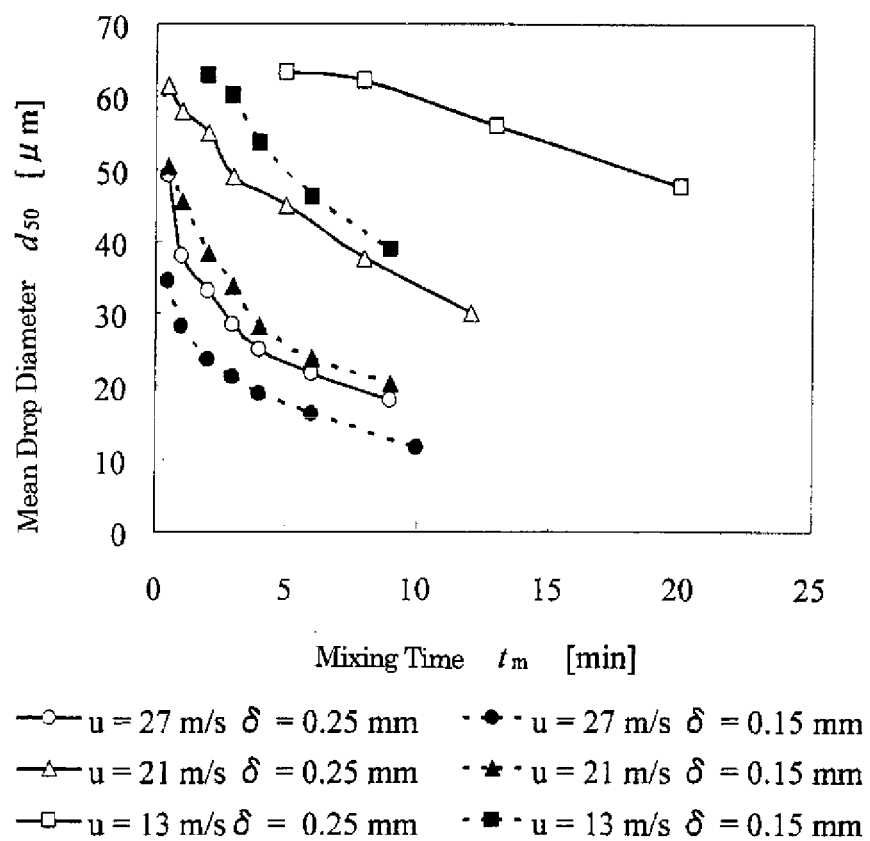
FIG. 5 illustrates the relationship (particle size breakup trend) between the processing (mixing) time under the particular running condition presented in Table 3 for the mixers A-1 and A-2 in Table 2 and the resulting drop diameters.

In describing the present invention below, the homogenization index: H.I. which can be derived by calculating the Equation 1 given below and which is proposed by the present invention is used to discuss, compare or estimate the particle size breakup effect (particle size breakup trend) in the mixer of the rotor-stator type.

$$H.I. = \frac{P_h}{\rho v_h} \frac{Q}{V} t_m \quad \text{the Equation 1}$$

$$= \left( \frac{N_{qd}(N_p - \pi^2 \cdot N_{qd}) d^8}{\pi \cdot h \cdot \delta(\delta + d) + \frac{\pi}{4} n_s dl} \right) \left( \frac{N^4 \cdot t_m}{V} \right)$$

$$= C_h \left( \frac{N^4 \cdot t_m}{V} \right)$$

In the Equation 1,
H.I: Homogenization Index [m²/s³]
σ: Concentration [kg/m³]
σh: Volume of the Gap [m³]
$P_h$: Power Consumption [W]
Q: Flow Rate [m³/s]
$t_m$: Mixing Time [s]
V: Fluid being Processed [m³]
$N_p$: Number of Powers [−]
$N_{qd}$: Number of Flow Rates [−]
h: Height of Stator [m]
d: Diameter of Hole of Stator [m]
$n_s$: Number of Holes of Stator [−]
l: Thickness of Stator [m]
σ: Gap between Rotor and Stator [m]
N: Number of Rotations [1/s]
$C_h$: Configuration Depending Term for Gap [m⁵]

By using the homogenization index: H.I. thus obtained by calculating the Equation 1, it is possible to discuss (compare or estimate) the particle size breakup effect (particle size breakup trend) in the mixer of the rotor-stator type systematically even though there may be any differences in the mixer configuration, the stator configuration, the mixer's running condition (processing time), the mixer's scale (sizes) and the like.

In the present invention, the mixer's performance can be estimated by measuring the magnitude (smallness or greatness) of the values for the configuration dependent term: $C_h$ [−] in the gap. Those values are specific to each of the mixers of the various types, and can be obtained by measuring the components included in the Equation 1 for deriving the homogenization index: H.I., such as the power requirements and flow rates during the running time and the respective sizes of the rotor and stator.

As it is clear from the Equation 1 proposed by the present invention to allow the value for the homogenization index: H.I. to be derived, the value for the configuration dependent term: $C_h$ [−] is specific to each of the mixers of the various types, and may vary depending on the gap between the rotor and stator δ[m], the stator's hole diameter d[m], the stator's number of holes $n_s$ [−], the stator's thickness l[m], the number of flow rates $N_{qd}$ [−], and the number of powers $N_p$ [−].

Then, the performance of each of the mixers of the various types can be estimated by comparing (estimating) the magnitude (smallness or greatness) of the value for the configuration depending term: $C_h$ [−] in the gap which is one of the components included in the Equation 1 proposed by the present invention for deriving the value for the homogenization index: H.I.

More specifically, by comparing (estimating) one of the components included in the Equation 1 of the present invention for deriving the value for the homogenization index H.I., that is, the configuration depending term: $C_h$ [−] which is specific to each of the mixers of the various types, it is found that the performance of each of the mixers of the various types can be estimated and the high performance mixer can be designed (developed and fabricated) accordingly.

By matching the values of the homogenization index: H.I. obtained on the experimental rotor-stator type mixer installation and/or on the pilot plant installation against the values for the homogenization index: H.I. obtained on the actual mixer installation intended for scaling up or scaling down the mixer so that the former H.I. values can conform with the latter H.I. values, it is also found that the mixer can be scaled up or scaled down.

By calculating the values for the homogenization index: H.I. using the Equation 1 proposed by the present invention for deriving the homogenization index: H.I. when the foods (such as dairy products, drinks, etc.), pharmaceutical medicines (such as the quasi-drugs) or chemical products (such as the cosmetics) are to be manufactured by subjecting the fluid being processed to the emulsification, dispersion, particle size breakup, mixing or any other process that occurs by using the rotor-stator type mixer, it is also found that those foods, pharmaceutical medicines or chemical products can be manufactured by estimating the mixer running time and the drop diameters obtained during the mixer running time for the fluid being processed.

As noted, it has been demonstrated by the embodiment of the present invention that the nutritive components (which correspond to the components such as the fluid foods, the powder milks prepared for babies) which have been manufactured according to the present invention have the good taste feeling, physical properties, quality and the like, and are also excellent from the viewpoint of the hygienic care or workability. Therefore, the present invention should preferably be applied to the manufacture of the foods or pharmaceutical medicines, more particularly it should be applied to the foods. Much more preferably, it should be applied to the nutritive components or dairy products. The most particularly preferred application of the present invention is the nutritive components and dairy products that contain the highly concentrated composition.

Change in the homogenization index: H.I. versus the resulting change in the drop diameter (particle size breakup trend):
A liquid that simulates a dairy product is prepared so that it can be used in estimating the drop diameters. This liquid that simulates the dairy product contains the milk protein concentration (MPC, TMP (total milk protein)), rapeseed oil and water. Its composition and ratio are given in Table 1.

TABLE 1

Composition Ratio of Simulated Liquid for Milk Product

| Composition | Milk Product Concentrate (MPC) | 8.0% |
|---|---|---|
| | Rape Seed Oil | 4.5% |
| | Water | 87.5% |
| | Total. | 100% |
| Ratio | Protein/Water | 9.1% |
| | Oil/Protein | 56.3% |
| | Oil/Water | 5.1% |
| Properties | Density | 1028 kg/m³ |
| | Viscosity | 15 mPa·s |

The mixer performance was estimated on the experimental basis by checking the particle size breakup trend for the drop diameters. As shown in FIG. 3, the externally circulated unit was provided, and the drop diameters were measured on the middle way of the fluid path by using the laser diffraction-type particle size analyzer (SALD-2000 as offered by Shimazu Manufacturing Company).

In the present invention, however, it is found that as far as the internally circulated mixer in particular is concerned, it is difficult to grasp the particle size breakup trend for the drop diameters when the particle size breakup trend for the drop diameters is reviewed on the experimental basis and the mixer performance is then estimated. For the internally circulated mixer and the externally circulated mixer, however, they are common in that either of those mixers comprises the mixer unit 4 which includes the stator 2 having the plurality of openings (holes) 1 and the stator which is disposed on the inner side of the stator 3 and spaced by the particular gap 6 away from the stator 2, as shown in FIG. 1. When the performance of the internally circulated mixer was then estimated. This was done by using the results obtained by estimating the externally circulated mixer, under the assumption that the internally circulated mixer comprised the same mixer unit as the externally circulated mixer which included the rotor and stator each having the same dimension (size), configuration and structure as the externally circulated mixer as shown in FIG. 4.

Then, the respective performances of the three different mixers were compared. The specifications of those mixers which were used for the comparison are given in Table 2.

TABLE 2

Summary of Mixer

|  | Mixer A-1 1.5 L | Mixer A-2 1.5 L | Mixer B 9 L |
|---|---|---|---|
| Stator No. | 6 | 6 | 7 |
| Rotor Diameter [mm] D | 30 | 30 | 57 |
| Maximum Rotation Speed [rpm] $N_{max}$ | 26000 | 26000 | 8400 |
| Maximum Motor Driving Power [kW] $P_{g, max}$ | 0.9 | 0.9 | 1.5 |
| Number of Openings [—] $n_s$ | 3 | 6 | 5 |
| Gap Size [mm] δ | 0.15 | 0.25 | 0.25 |
| Gap Volume [m$^3$] $v_g$ | $6.08 \times 10^{-8}$ | $8.44 \times 10^{-8}$ | $4.24 \times 10^{-7}$ |

Number of Rotor blades

In Table 2, the mixers A-1 and A-2 have the same capacity of 1.5 liters and have the same size although they are offered by the same manufacturer In Table 2, it is shown that the gap volume: $V_g$ corresponds to the volume in the gap δ in FIG. 1.

The number of agitating blades for each of the rotors 3 that is included in each of the mixers A-1 and A-2 (having the capacity of 1.5 liters) and B (having the capacity of 9 liters) is equal to four.

The experimental conditions and the values that were obtained by calculating the homogenization index for those three different mixers under those experimental conditions are presented in Table 3.

TABLE 3

Experimental Conditions and Calculated Values

| Stator No. | Mixer A-1 | Mixer A-2 | Mixer B |
|---|---|---|---|
| Rotational Speed N [rpm] | 17000 | 17000 | 8400 |
|  | 13600 | 13600 | 6720 |
|  | 8400 | 8400 |  |
| Rotor Tip Speed u [m/s] | 27 | 27 | 25 |
|  | 21 | 21 | 20 |
|  | 13 | 13 |  |

TABLE 3-continued

Experimental Conditions and Calculated Values

| Stator No. | Mixer A-1 | Mixer A-2 | Mixer B |
|---|---|---|---|
| Configuration Dependent Term $C_h$ [m$^5$] | $2.57 \times 10^{-8}$ | $1.46 \times 10^{-8}$ | $2.50 \times 10^{-6}$ |
|  | $2.16 \times 10^{-8}$ | $7.42 \times 10^{-9}$ | $9.30 \times 10^{-7}$ |
|  | $2.99 \times 10^{-8}$ | $1.09 \times 10^{-8}$ |  |
| Homogenization Index H.I. [m$^2$/s$^3$] | $1.11 \times 10^5$ | $6.28 \times 10^4$ | $1.07 \times 10^5$ |
|  | $3.80 \times 10^4$ | $1.31 \times 10^4$ | $1.63 \times 10^4$ |
|  | $7.66 \times 10^3$ | $2.78 \times 10^3$ |  |

From the values of the homogenization index obtained by the Equation 1 and presented in Table 3, it was estimated that the particle size breakup effect (particle size breakup performance) would become higher as the gap in the mixer is narrower and as the number of rotations for the stator is greater.

For the mixers A-1 and A-2 in Table 2, the relationship (particle size breakup trend) between the processing (mixing) time under the running conditions and the resulting drop diameters is then presented in FIG. 5.

Figure 6:
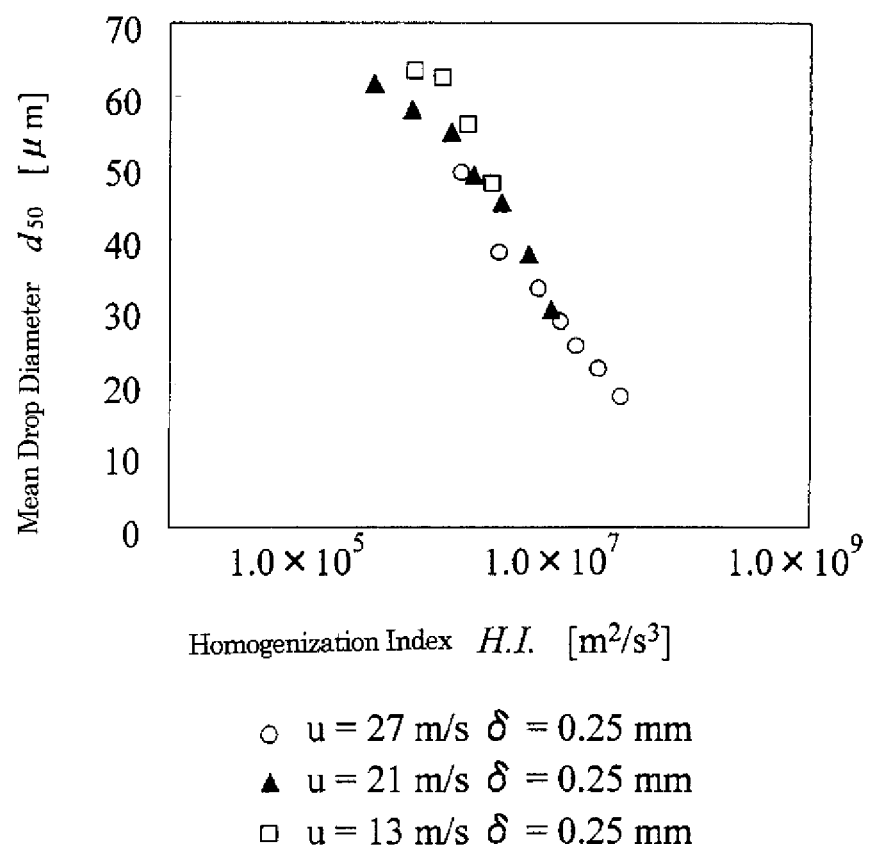
FIG. 6 illustrates the relationship (particle size breakup trend) between the homogenization index: H.I. and the drop diameters when the rotating speed of the rotor for the mixer A-2 in Table 2 is changed.

FIG. 6 presents the relationship (particle size breakup trend) between the homogenization index proposed by the present invention and the resulting drop diameters in the case in which the speed of rotation of the rotor for the mixer A-2 in Table 2 was changed.

Figure 7:
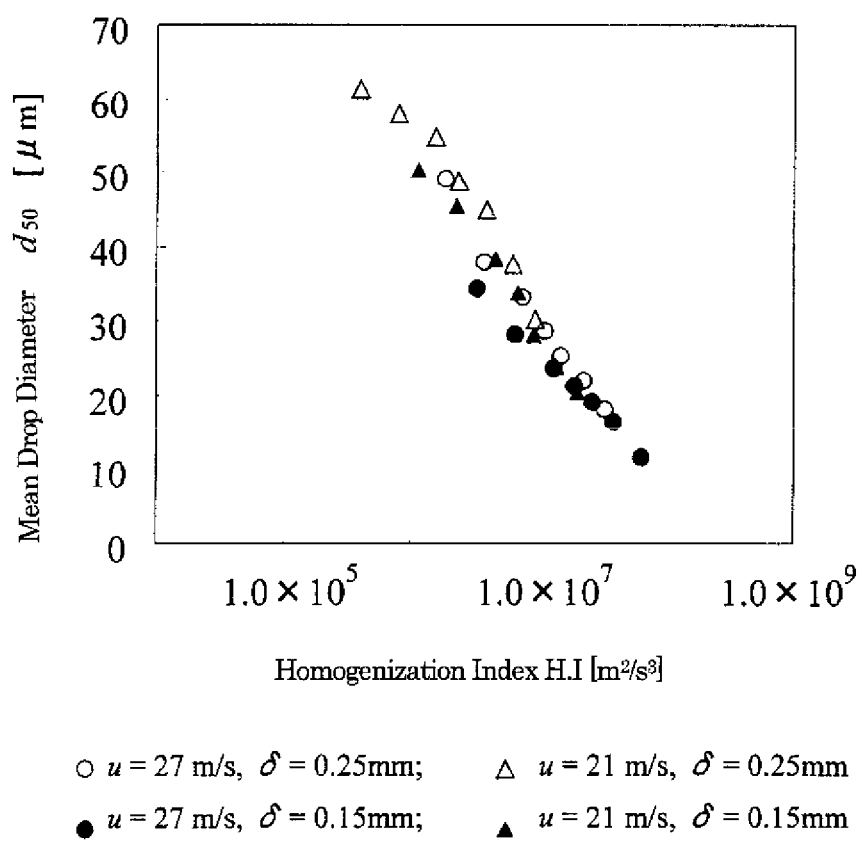
FIG. 7 illustrates the relationships (drop breakup trend) between the homogenization index: H.I. and the resulting drop diameter when the rotating speed of the rotor for the mixers A-1 and A-2 in Table 2 is changed.

For the mixers A-1 and A-2 in Table 2, the relationship (particle size breakup trend) between the homogenization index: H.I. proposed by the present invention and the resulting drop diameters in the case in which the speed of rotation of the rotor of each of the mixers is presented in FIG. 7.

Figure 8:
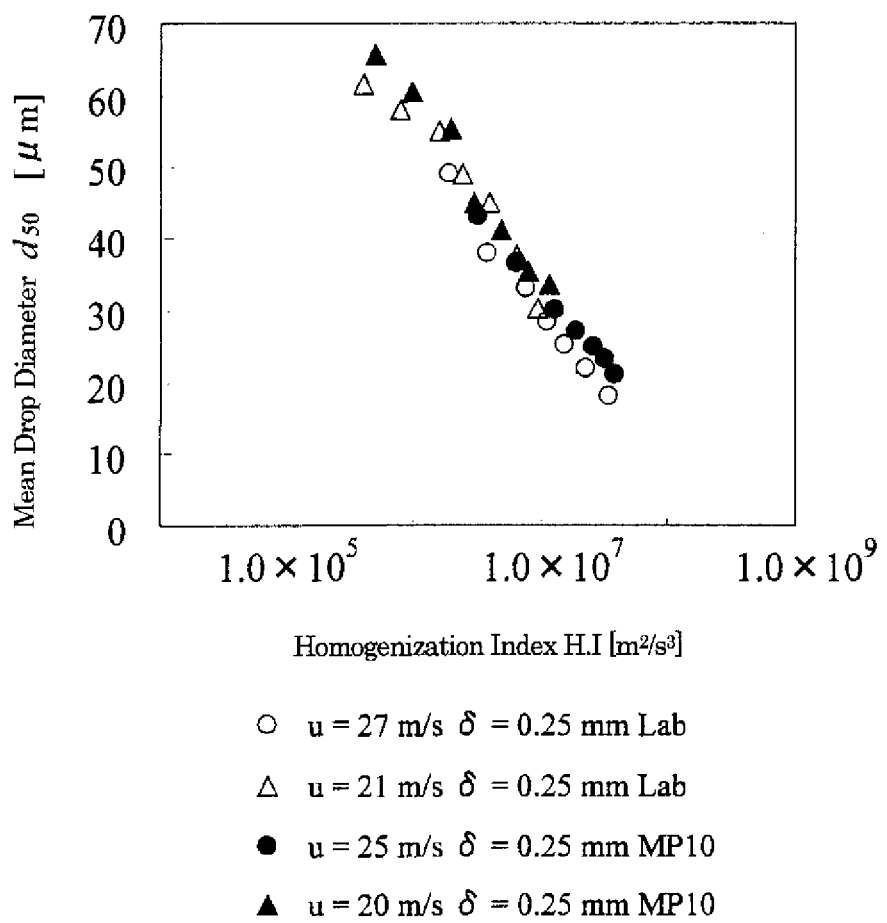
FIG. 8 illustrates relationship (particle size breakup trend) between the homogenization index: H.I. and the resulting drop diameter when the rotating speed of the rotor for the mixers A-2 and B in Table 2 is changed.

For the mixers A-2 and B in Table 2, the relationship (particle size breakup trend) between the homogenization index: H.I. proposed by the present invention and the resulting drop diameters in the case in which the speed of rotation of the rotor of each of the mixers is presented in FIG. 8.

Figure 9:
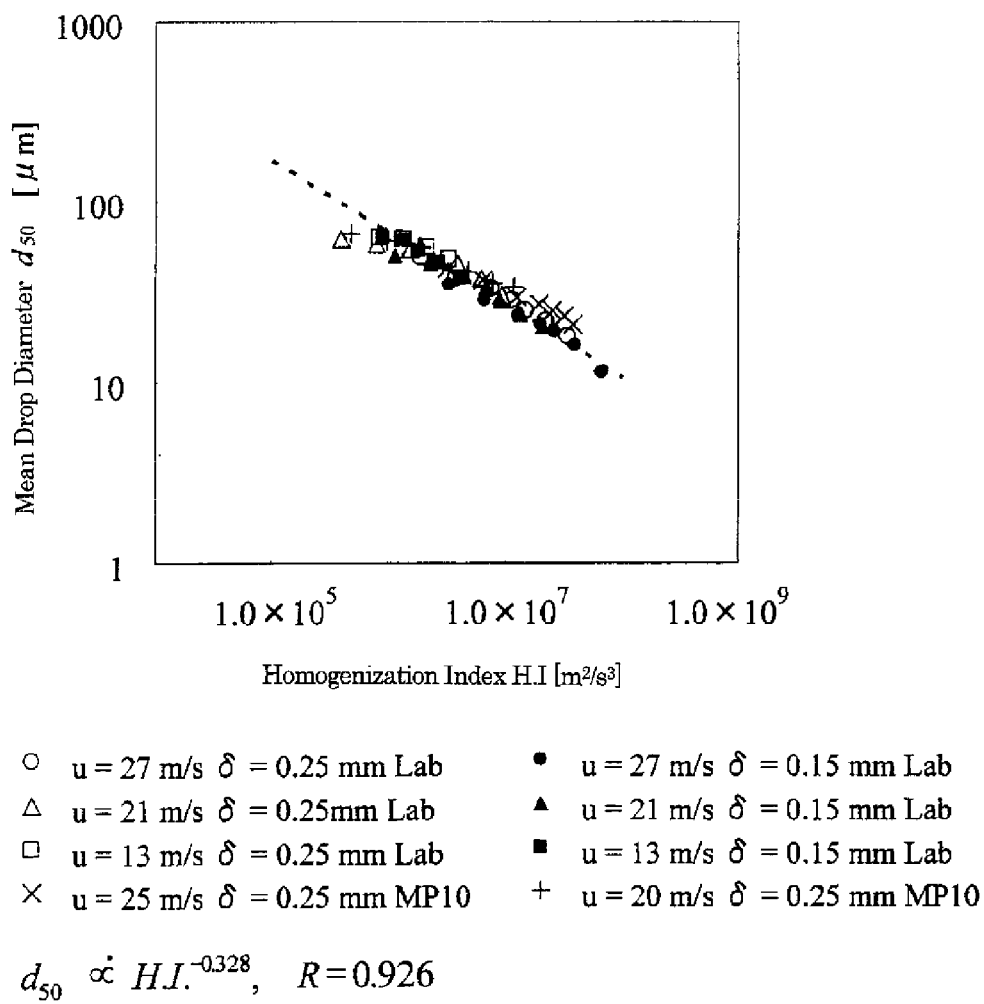
FIG. 9 illustrates the relationship (particle size breakup trend) between the homogenization index: H.I. and the resulting drop diameter when the rotating speed of the rotor for the mixers A-1, A-2 and B in Table 2 is changed.

For the mixers A-1, A-2 and B in Table 2, the relationship (particle size breakup trend) between the homogenization index: H.I. proposed by the present invention and the resulting drop diameters in the case in which the speed of rotation of the rotor of each of the mixers is presented in FIG. 9.

In Table 3, when the homogenization index: H.I. is calculated and compared with the results presented in FIG. 5 through FIG. 9, it is found that the assumed values (theoretical values) and the measured values (actually measured values) exhibit the similar trends and that the particle size breakup effect (particle size breakup performance) will become higher as the gap δ of the mixer is smaller for all numbers of the rotation.

When the results obtained by the experiments were organized properly with the processing (mixing) time being given along the X coordinate, on one hand, it was found that the changes in the drop diameter (particle size breakup trend) could not be expressed (estimated) comprehensively.

When the results obtained by the experiments were plotted with the homogenization index being given along the X coordinate, on the other hand, it was found that the changes in the drop diameter (particle size breakup trend) could be expressed (estimated) comprehensively.

As this is mentioned before, it is found that the drop diameter will have the trend showing that the drop diameter will be decreasing in the same manner even though there are any differences in the running conditions (such as the number of rotations and mixing time) and mixer's configuration (such as the gap and the number of openings).

As it is described more specifically, it is clear that the homogenization index: H.I., which can be obtained by the Equation 1 below as proposed by the present invention, can represent the index that allows the performance for the mixer of the stator-rotor type to be estimated by taking the differences in the mixer running conditions and configuration into account.

Furthermore, it was found that the drop diameter will be changing, depending upon the values for the homogenization index: H.I. even though there are any differences in the mixer's scale (size). It was also found that the drop diameter would be changing in the same manner regardless of the difference in the mixer's scale.

It may be apparent from the foregoing description that the mixer of the rotor-stator type can be scaled up by matching the mixer against the values (sizes) of the homogenization index: H.I. proposed by the present invention so that the mixer can conform with those values, and then by taking the differences in the running condition and configuration into account comprehensively.

For the mixer which depends on the gap and opening, the present invention allows the mixer's performance estimation and scale-up operations to be performed by taking the particle size breakup operation effect and emulsification effect into account comprehensively. According to the present invention in one of its specific forms, the theory that is applicable to a wider range of mixers can be implemented and developed on the basis of the performance estimation method and scale-up method which have been used.

(Configuration and Design of High Performance Mixer)

Figure 10:
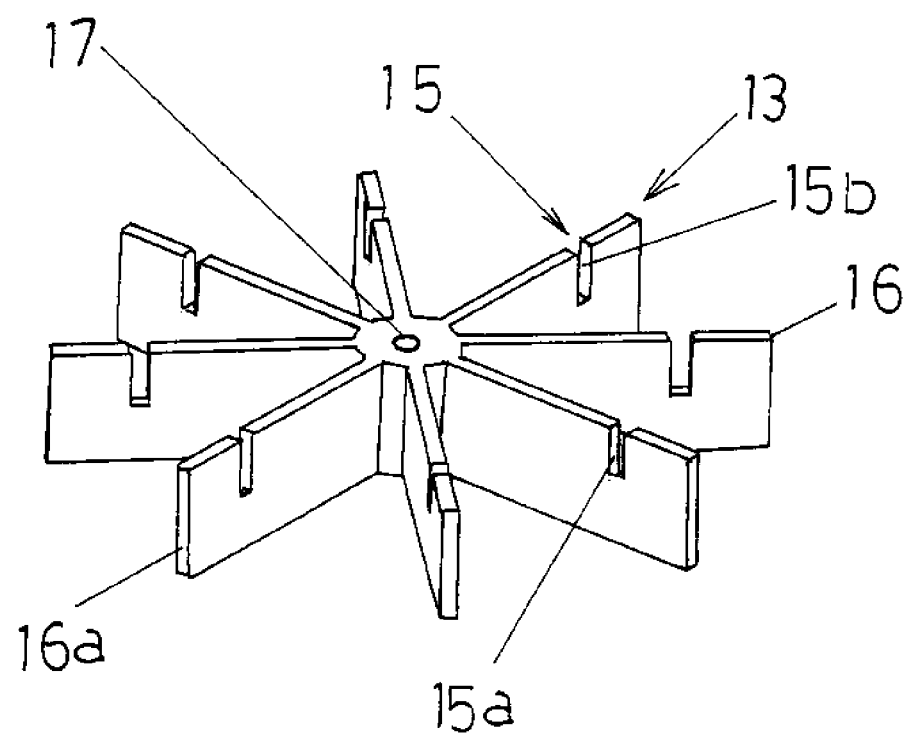
FIG. 10 is a perspective view illustrating one example of the rotor that is included in the mixer of the rotor-stator type according to the present invention.
Figure 11:
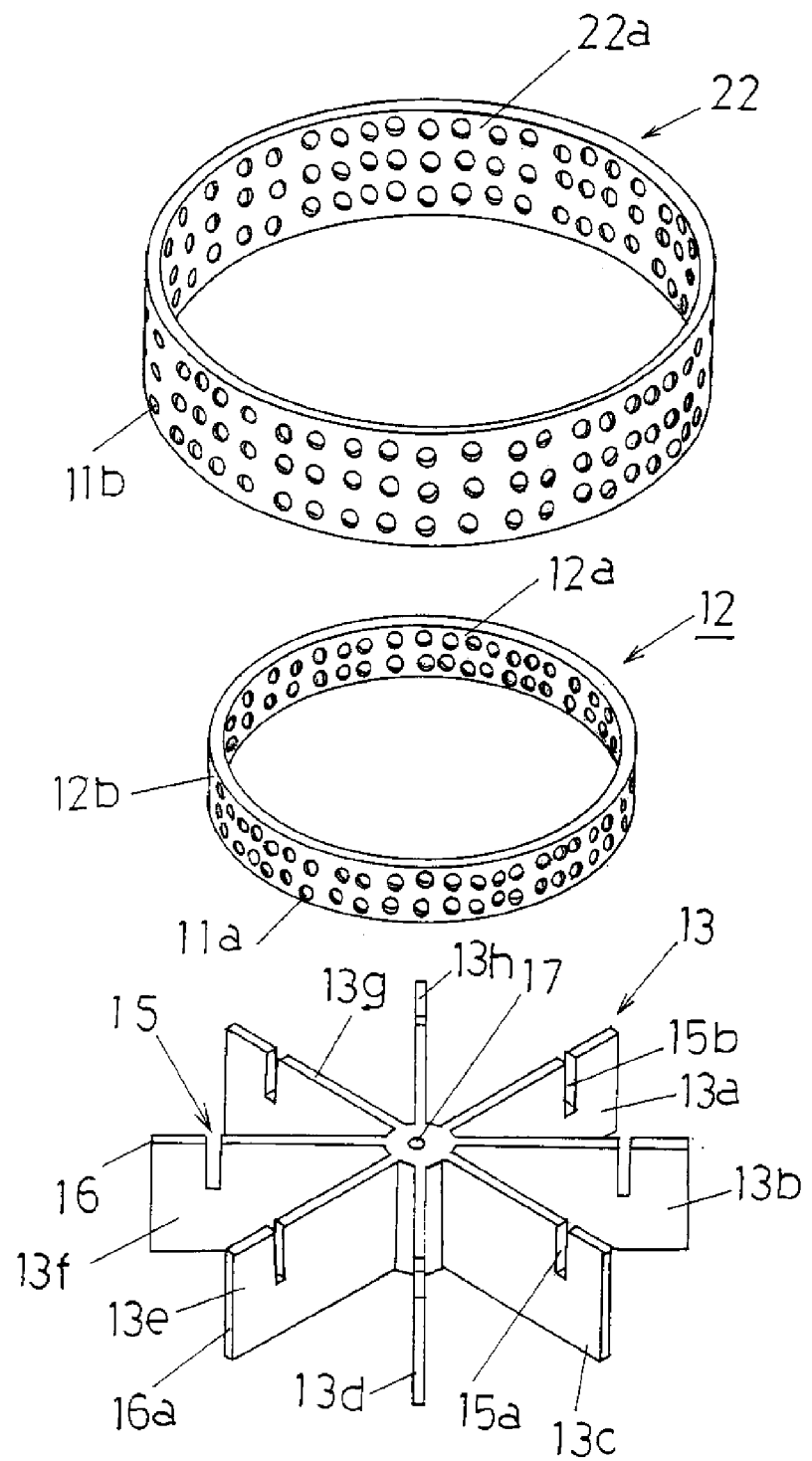
FIG. 11 is an exploded perspective view illustrating one example of the multi-staged emulsification mechanism that is employed in the mixer of the rotor-stator type according to the present invention.
Figure 12:
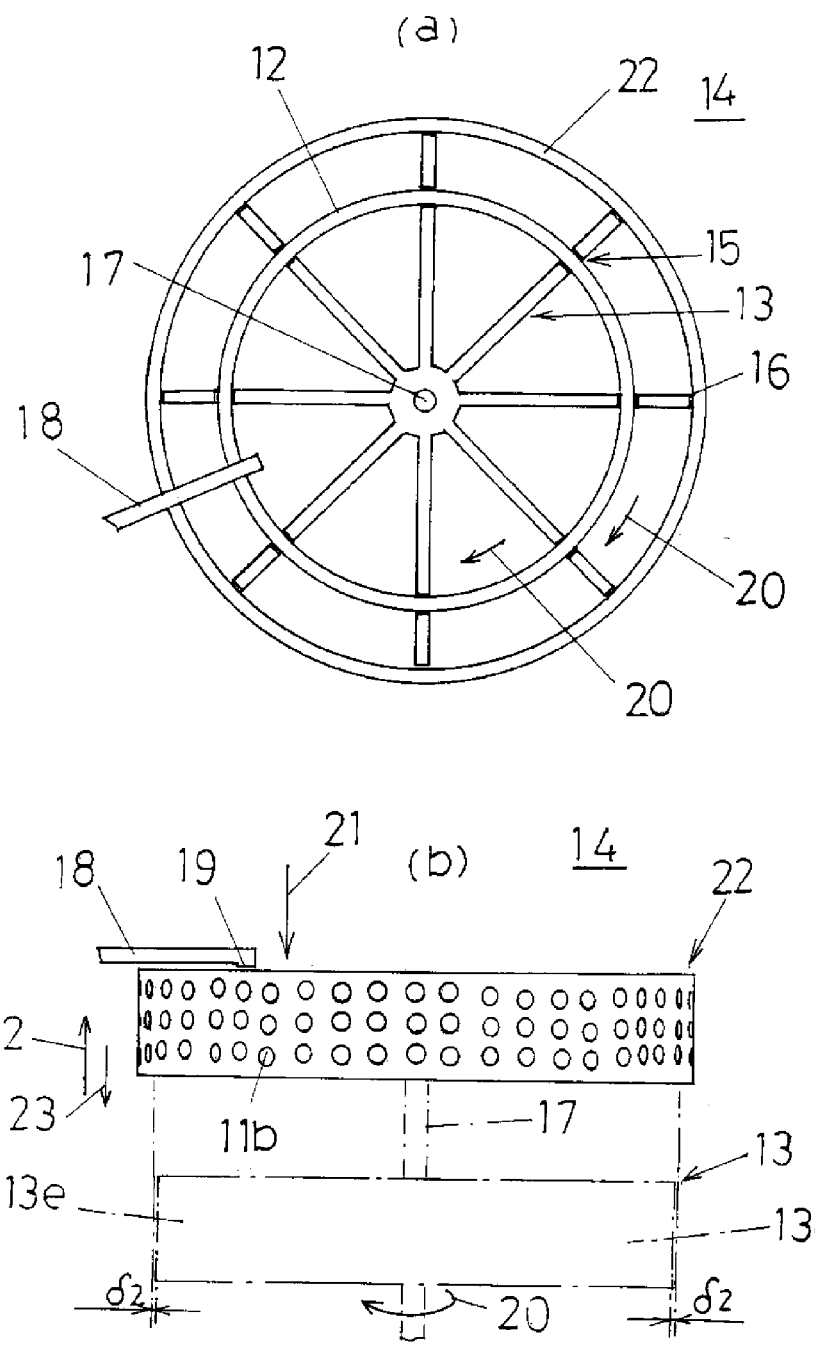
FIG. 12 illustrates the direct injection system that is employed in the mixer of the rotor-stator type according to the present invention, in which (a) is a plan view and (b) is a side view.
Figure 13:
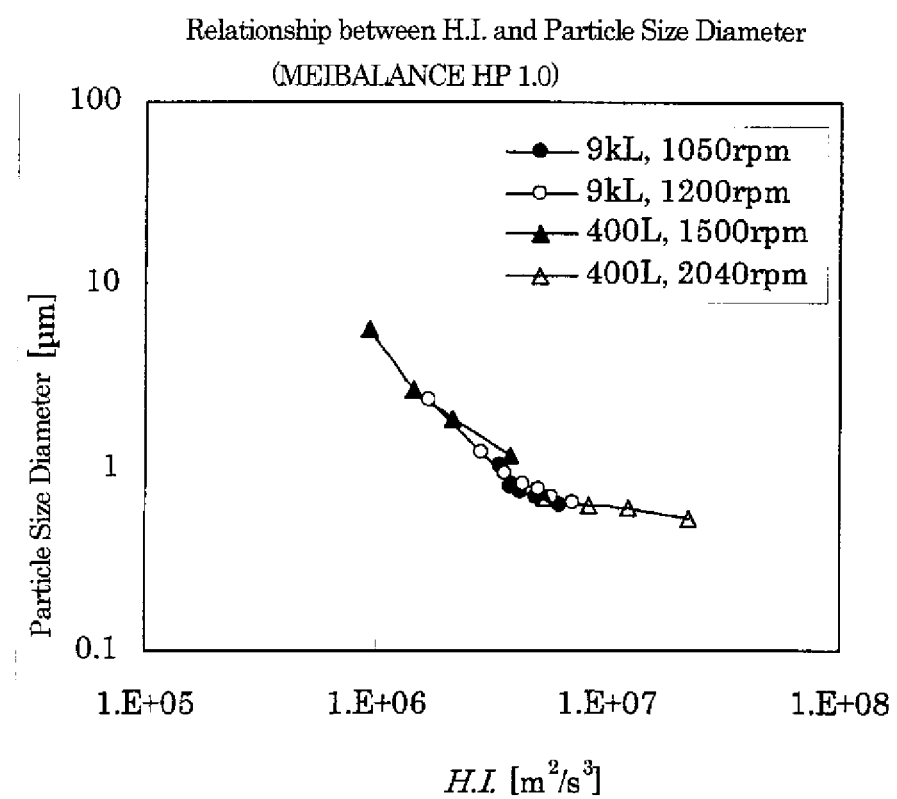
FIG. 13 illustrates the relationship (particle size breakup trend) between the homogenization index: H.I. and the resulting diameter when the nutrition regulated foods that are available on the commercial market are mixed together by using the mixer of the rotor-stator type.

In the present invention, the configuration of the high performance mixer can be defined by using the values for the mixer's performance index derived from the Equation 1 of the present invention as the index that may be used to estimate the mixer's performance, and then by using the values for the estimation that results from the above as the reference information. Then, the high performance mixer can be designed from this definition. The general structure of the mixer that may thus be designed is shown in FIGS. 10 through 12.

(Moving Stator)

When the mixer of the rotor-stator type is used to dissolve (mix) the powdery material or liquid material, and to thereby manufacture the emulsified products, it is possible that the mixer will process the powdery material while the air that has been introduced with the powdery material into the mixer remains not to be separated from the introduced powdery material. If this situation occurs, the liquid thus mixed may contain fine air bubbles produced by mixing the powdery material. For those years, it has been known that if the mixed liquid is emulsified with such fine air bubbles remaining in the liquid, the particle breakup or emulsification performance (effect) will become worse, as compared with the case in which the mixed liquid is emulsified with no air bubbles remaining in the liquid.

In order to prevent such fine air bubbles being produced at the initial stage of dissolving the powdery material, therefore, it is desirable that the mixer is equipped with a moving stator mechanism. In particular, when the powdery material that may tend to produce the air bubbles more easily is processed so as to manufacture the emulsified products, it is more desirable that the mixer should be equipped with the moving stator mechanism. By moving the moving stator away from the rotor at the initial stage of dissolving the powdery material, the powdery material can be diffused quickly into the liquid being mixed or prepared. This can be performed without causing any high energy dissipation. It is preferred that the dissolving, particle size breakup and emulsifying steps for the powdery material should be performed by moving the stator closer to the rotor on the production mode.

(Multistage Homogenizer (Multistage Emulsifying Mechanism)

As described above, it is confirmed that the performance (effect) with which the particle size breakup or emulsification operation occurs will become better as the values of the homogenization index: H.I. derived from the Equation 1 proposed by the present invention become larger.

Then, it is desirable that the mixer includes several mixing portions formed in the gap between the rotor and the stator.

For example, the particle size breakup operation may occur on the preliminary mode in the gap between the first-stage rotor and stator, and may then be performed on the production mode in the gap between the second-stage rotor and stator.

(Direct Injection (Direct Injection Adding Mechanism))

As it is clear from the mixer performance estimation which serves as the index for the homogenization index: H.I. derived from the Equation 1 proposed by the present invention and from the results obtained by verifying the value for the index, it is confirmed that the particle breakup or emulsification performance (effect) will become better as the value for the above index becomes larger.

Then, by delivering (adding) oils, component in its undissolved state, micro component or other similar components directly into the mixing portions (mixer section), the emulsification or dispersion operation can be performed more effectively. Particularly, when those components are delivered (injected) directly into the first-stage stator (the stator located radially inwardly), the emulsification or dispersion operation can be performed much more effectively on the production mode by the second-stage stator (the stator located radially outwardly) that follows the preliminary stage of the first-stage stator.

(Configuration of High Performance Mixer)

As described above, it is confirmed that the particle size breakup or emulsification performance (effect) will become better as the values of the homogenization index: H.I. derived from the Equation proposed by the present invention are larger. The opening (hole) formed in the stator should desirably have the round shape instead of the comb-like shape.

Note, however, that there is a risk that the powdery material might block the passage through the opening (hole) if the stator has the hole diameter of less than 2 mm. In order to permit both the dissolving process and emulsification process for the powdery material to be performed concurrently, it is desirable that the stator should have the hole diameter of between 2 mm and 4 mm.

In addition, the opening provided in the stator should desirably represent 20% or more of the total opening area on the peripheral wall of the stator.

The shear frequency will become higher as the number of holes provided on the stator (opening area ratio) is increased. The problem is, however, that the strength of the opening on the stator will be affected in this case. In the prior art, the opening area ratio of between 18% and 36% is generally employed in most cases, but it is desirable that the opening area ratio should be equal to 30% or more. It is more desirable that it should be equal to between 40% and 50%.

In addition, the rotor should desirably be equipped with several agitating blades extending radially from the center of rotation. Preferably, the rotor should be equipped with six or more agitating blades, or more preferably eight agitating blades.

Embodiment 1

The following description provides several examples of the preferred embodiment of the present invention by referring to the accompanying drawings, but it should be understood that the present invention is not restricted to those examples of the embodiment described herein and that various modifications or changes may be made without departing from the spirit and scope of the present invention defined in the appended claims.

By referring now to FIGS. 10 through 12, the summary of the high performance mixer will be provided below. The homogenization index: H.I. which is derived from the Equation 1 proposed by the present invention can be used as the index for estimating the performance of the high performance mixer, and the configuration of the high performance mixer can be defined by using the results that are obtained by verifying the estimation for the performance. Then, the high performance mixer can be designed by using the definition for the configuration of mixer thus obtained.

The mixer of the rotor-stator type proposed by the present invention may be characterized by the fact that the mixer comprises the mixer unit 14 that includes the plurality of stators each having a plurality of openings (holes) and the rotor disposed on the inner side of each of the stators and spaced by the particular gap away from each said stator. Other structural elements are the same as those of the prior art mixer of the rotor-stator type that has been described above. Note that the following description is only directed to one example of the mixer unit 14 which has the construction and mechanism that characterize the present invention.

The mixer unit 14 for the mixer of the rotor-stator type according to the present invention includes the rotor 13 and stators 12, 22, each of which is constructed as shown in FIGS. 10 and 11.

Each of the stators 12, 22 is provided with a plurality of round shape openings 11a, 11b like the stator 2 in the prior art mixer 4 shown in FIG. 1.

Of the stators 12, 22, the stator 22 has the circumferential diameter that is greater than the stator 12, and is arranged concentrically on the mixer unit 14 as shown in FIG. 12 (a).

The rotor 13, on the inner side of which the stators 12, 22 are disposed and spaced by the particular gap away from the rotor 13, is equipped with a plurality of agitating blades extending toward the center of rotation 17 about which the rotor 13 rotates. In the embodiment shown, for example, the rotor 13 is equipped with eight agitating blades 13a, 13b, 13c, 13d, 13e, 13f, 13g, and 13h.

Each of the agitating blades 13a though 13h has a longitudinal groove 15 formed in the radial center thereof and located between the center of rotation 17 and the outermost end 16. The longitudinal groove 15 has the same diameter for all agitating blades.

When the mixer unit 14 is formed as shown in 12 (a) and (b), the stator 12 may be mounted into the longitudinal groove 15 formed in each of the agitating blade 13a through 13h. For each of the agitating blades 13a though 13h, then, this creates a gap 2 δ between the wall 16a of the radial outermost end 16 thereof and the inner peripheral wall 22a of the stator 22. Additionally, a gap is formed between the outermost peripheral face of each of the agitating blades 13a through 13h and the inner peripheral wall 12a of the stator 12, and a gap is formed between the inner peripheral face 15b of the longitudinal groove 15 of each of the agitating blades 13a through 13h and the outer peripheral wall 12b of the stator 12.

As it is apparent for the mixer unit 14 in the mixer of the rotor-stator type that has been described above, the rotor is disposed on the inner side of each of the stators 12, 22 having the different circumferential diameter and spaced by the particular gap away from each of the stators.

When the rotor 13 is rotated in the direction of an arrow 20 by causing the rotary shaft 17 to rotate about its center of rotation, the two-stage mixing section including the mixing portion located radially inwardly and the mixing portion located radially outwardly is created. This multistage mixing section permits the mixing process to occur with the high performance.

In the embodiment shown, the mixing portion located radially inwardly may be created between the outer peripheral surface 15a of the longitudinal groove 15 on each of the agitating blades 13a through 13h and the inner peripheral wall 12a of the stator 12 and between the inner peripheral wall 15 of the longitudinal groove 15 on each of the agitating blades 13a through 13h and the outer peripheral wall 12b of the stator 12. The mixing portion located radially outwardly may be created between the wall 16a of the radially outward end of each of the agitating blades 13a through 13h and the inner peripheral wall 22a of the stator 22.

In the mixer of the present invention, each of the stators 12, 22 can be moving closer to the rotor 13 and moving farther away from the rotor 13 in the direction in that the rotary shaft 17 of the rotor 13 extends. In the embodiment shown, the rotor 13 can be moving in the direction of arrows 22, 23 in FIG. 12 in which the rotary shaft 17 extends.

The mixer of the present invention can take the two states as described earlier, that is, one being the state in which the mixer unit 14 can be created by allowing the stator 12 to be fitted in the longitudinal groove formed in each of the agitating blades 13a through 13h when the rotor 13 is moving in the direction of an arrow 22 in FIG. 12 (b), and the other being the state in which the rotor 13 is moving away from the stators 12, 13 as shown by the imaginary lines in FIG. 12 (b).

At the initial stage in which the powdery material is dissolved by the mixer, it can be dispersed quickly into the mixing liquid by moving the rotor 13 away from each of the stators as shown by the arrow 23 in FIG. 12 (b). Note that this can be performed without causing the high energy dissipation to occur.

The subsequent steps of the dissolution, particle size breakup and emulsification process can be performed efficiently on the production mode by moving the rotor 13 as shown by the arrow 22 in FIG. 12 (b) so that the two-stage mixing section can be created in the radially inward direction and in the radially outward direction as described above, and then by moving the rotor 13 in the direction shown by the arrow 20 in FIG. 12 (b).

In the mixer of the present invention, a nozzle 18 extends radially toward the center along the upper ends of the stators 12, 22 constituting the mixer unit 14 as shown in FIG. 12 (a), allowing the fluid being processed to be delivered directly through the nozzle inlet 19 of the nozzle 18 and into the mixing portion (mixer section) as shown by the arrow 21 in FIG. 12.

More specifically, the fluid being processed is delivered as shown by the arrow 21 into the first-stage mixing section located on the inner side, that is, it is delivered directly through the nozzle inlet 19 and between the outer peripheral surface 15a of each of the longitudinal grooves 13a through 13h and the inner peripheral wall 12a of the stator 12, where the first-stage mixing (preliminary mixing) occurs. Following the first-stage mixing portion, the fluid being processed is then delivered into the second-stage mixing portion located on the outer side, that is, between the radially outside end of the wall 16a of each of the agitating blades 13a through 13h and the inner peripheral wall 22a of the stator 22, where the second-stage mixing occurs on the productive mode.

It may be appreciated from the above description that the fluid being processed can be delivered directly into the first-stage and second-stage mixing portions (mixing section), where it can be emulsified and dispersed more effectively.

Embodiment 2

The test for the particle size breakup operation took place by using the nutrition prepared foods as offered by MIJI NYUGYO CORP. (MEIBALANCE 1.0 H.P. (Trademark)).

The compositions and physical properties of MEIBALANCE 1.0 H.P. are presented in Table 4.

TABLE 4

| Nutrition Conditioned Foods (MEIBALANCE HP 1.0 (Trademark)) | |
|---|---|
| Composition (100 mL) | |
| Energy [kcal] | 100 |
| Protein [g] | 5.0 |
| Fat [g] | 2.5 |
| Saccharide [g] | 14.1 |
| Dietary Fiber [g] | 1.2 |
| Ash [g] | 0.7 |
| Water [g] | 84.3 |
| Property Value | |
| Osmotic Pressure [mOsm/L] | 420 |
| pH (20° C.) [—] | 6.7 |
| Viscosity (20° C.) [mPa · s] | 10 |
| Specific Gravity (20° C.) [—] | 1.078 |

In the current embodiment 2, two types of mixers (one has the capacity of 9 kiloliters and the other has the capacity of 400 liters) were used, and the experiment was conducted by varying the rotating speed of the rotor and the accumulating time. Those two types of mixers are the same as the mixer A which was demonstrated under the embodiment 1 of the present invention.

The experimental conditions and the values of the homogenization index: H.I. that were obtained under the experimental conditions are presented in Table 5.

TABLE 5

| Experimental Conditions and Calculated Values (MEIBALACE HP 1.0) | | | |
|---|---|---|---|
| | | | H.I. |
| 9 kL | | 1050 rpm | 8.52E+04 |
| | | 1200 rpm | 1.43E+05 |
| 400 L | | 1500 rpm | 1.71E+05 |
| | | 2040 rpm | 9.76E+05 |
| | Time [min] | d 50 [μm] | Accumulated Time [min] | H.I [m²/s³] |
| 9 kL 1050 rpm | 40 | 1.013 | 40 | 3.41E+06 |
| | 5 | 0.771 | 45 | 3.84E+06 |
| | 5 | 0.742 | 50 | 4.26E+06 |
| | 7 | 0.691 | 57 | 4.86E+06 |
| | 15 | 0.619 | 72 | 6.14E+06 |
| 9 kL 1200 rpm | 7 | 13.8 | 7 | 1.00E+06 |
| | 5 | 2.37 | 12 | 1.72E+06 |
| | 8 | 1.2 | 20 | 2.86E+06 |
| | 5 | 0.925 | 25 | 3.57E+06 |
| | 5 | 0.807 | 30 | 4.29E+06 |
| | 5 | 0.751 | 35 | 5.00E+06 |
| | 5 | 0.696 | 40 | 5.72E+06 |
| | 10 | 0.642 | 50 | 7.15E+06 |
| 400 L 1500 rpm | 5.5 | 5.763 | 5.5 | 9.39E+05 |
| | 3 | 2.667 | 8.5 | 1.45E+06 |
| | 4 | 1.884 | 12.5 | 2.13E+06 |
| | 10 | 1.176 | 22.5 | 3.84E+06 |

TABLE 5-continued

| Experimental Conditions and Calculated Values (MEIBALACE HP 1.0) | | | | |
|---|---|---|---|---|
| 400 L 2020 pm | 5.5 | 0.68 | 5.5 | 5.37E+06 |
| | 3 | 0.617 | 8.5 | 8.30E+06 |
| | 4 | 0.593 | 12.5 | 1.22E+07 |
| | 10 | 0.527 | 22.5 | 2.20E+07 |

The relationship between the values for the homogenization index: H.I. thus obtained and the drop diameters (the resulting particle size breakup trend) is presented in FIG. 3.

When the experimental results were organized into the appropriate tabular forms as the values for the homogenization index: H.I. [m²/s³] proposed by the present invention being given along the X coordinate, it was found that the change in the drop diameter (the particle size breakup trend) can be expressed (estimated) comprehensively and systematically.

The present invention can be applied to the various industrial fields such as the emulsification, dispersion, particle size breakup and other similar processes. Examples of those applications include the manufacturing fields such as foods, pharmaceutical medicines and chemical products since the present invention provides the excellent effects and functions.

The features of the present invention that have been described so far are summarized below:

(1) For the conventional mixers of the rotor-stator type which are available on the commercial market, the performance of those mixers can be estimated by simply operating the mixers using the usual water (water running) instead of using the actual processing liquid. By reviewing the water running operation that is convenient for making such review, the most suitable mixer of the rotor-stator type that can meet each user's requirements for using the mixer can be selected. In this way, the cost of selecting the mixer can be reduced, and the time for the review can also be decreased.

(2) By adopting the geometrical size that can maximize the configuration depending term of the homogenization index: H.I. in the gap, the performance can be enhanced, designed and manufactured for the inventive and novel mixers of the rotor-stator type, and the performance for the conventional mixers that already exist can be improved as well.

(3) For the various mixers of the rotor-stator type that ranges from the small scale to the large scale, the scale-up or scale-down operations efficiency can be achieved by taking the processing (manufacturing) time required for those mixers into consideration.

(4) What is required to obtain the particle size effect (drop diameter) that can meet each user's requirements is only to estimate the processing (agitating) time required for that purpose and to operate those mixers with the minimum running (processing) time under such estimation. In this way, the running time required for such mixers can be reduced, and the energy requirements can thus be saved.

(5) In accordance with the present invention, the mixers of the rotor-stator type that provide the higher particle size breakup and emulsification effects and higher quality than the typical high performance (high shear type) rotor-stator type mixers that have been offered in the prior art can be manufactured.

(6) According to the present invention, the mixers of the rotor-stator type offered by the present invention can provide the higher particle size breakup and emulsification effects and higher quality than the equivalent mixers offered by the prior art, and the processing time can thus be reduced.

(7) For the various mixers of the rotor-stator type that range from the small scale to the large scale, the scale-up or scale-down process can be achieved by tanking the processing (manufacturing) time required for those mixer into consideration.

What is claimed is:

1. A mixer of a stator-rotor type comprising a mixer unit that includes a stator having a plurality of openings (holes) and a rotor disposed on the inner side of the stator and spaced by a particular gap away from the stator, wherein the stator and rotor are arranged in such a manner that they can be moving closer to each other and moving farther away from each other in a direction in which a rotary shaft of the rotor extends, the mixer having a construction that is designed by using the Equation 1 given below in such a manner that a particular mixer running time and a particular drop diameter during the particular mixer running time can be obtained when a fluid being processed is subjected to an emulsification, dispersion, particle size breakup or mixing process and by calculating the particular mixer running time and the resulting drop diameter by using the Equation 1:

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1,
H.I: Homogenization Index [m²/s³]
ρ: Concentration [kg/m³]
vh: Volume of the Gap [m³]
$P_h$: Power Consumption [W]
Q: Flow Rate [m³/s]
$t_m$: Mixing Time [s]
V: Fluid being Processed [m³]
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
σ: Gap between Rotor and Stator [m]
N: Number of Rotations [1/s]
$C_n$: Configuration Depending Term for Gap [m⁵].

2. The mixer as defined in claim 1, wherein the mixer includes a plurality of stators each having a different diameter and a rotor disposed on the inner side of each of the stators and spaced by a particular gap away from said each stator.

3. The mixer as defined in claim 2, wherein the fluid being processed is introduced into the gap between each of the stators and the rotor disposed on the inner side of each of the stators and spaced by the particular gap away from said each stator.

4. The mixer as defined in claim 1, wherein the rotor includes a plurality of agitating blades extending radially from a center of rotation of the rotor.

5. A method for estimating the performance of a mixer of a rotor-stator type comprising a mixer unit that includes a stator having a plurality of openings (holes) and a rotor disposed on the inner side of the stator and spaced by a particular gap away from the stator, wherein the method includes the steps of: using the Equation 1 given below to obtain the values for the homogenization index: H.I., measuring components included in the Equation 1, including the respective size of the rotor and stator and the power requirements and flow rate during the running time of the mixer, estimating the magnitude (smallness or greatness) of the values for a configuration dependent term in the gap that is specific to the mixer, and estimating the performance of the mixer in a fluid being processed subject to a particle size breakup, emulsification, dispersion, mixing, dissolving and agitation process:

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1,
H.I: Homogenization Index [m²/s³]
ρ: Concentration [kg/m³]
vh: Volume of the Gap [m³]
$P_h$: Power Consumption [W]
Q: Flow Rate [m³/s]
$t_m$: Mixing Time [s]
V: Fluid being Processed [m³]
$N_p$: Number of Powers [–]
$N_{qd}$: Number of Flow Rates [–]
h: Height of Stator [m]
d: Diameter of Hole of Stator [m]
$n_s$: Number of Holes of Stator [–]
l: Thickness of Stator [m]
94 : Gap between Rotor and Stator [m]
N: Number of Rotations [1/s]
$C_n$: Configuration Depending Term for Gap [m⁵].

6. A method for scaling up or scaling down a mixer of a rotor-stator type comprising a mixer unit that includes a stator having a plurality of openings (holes) and a rotor disposed on the inner side of the stator and spaced by a particular gap away from the stator, wherein the method includes the steps of: using the Equation 1 given below to obtain the value for the homogenization index: H.I. on an experimental mixer installation and/or a pilot plant mixer installation, matching the thus obtained values for the homogenization index: H.I. against the values for the homogenization index: H.I. on an actual mixer installation so that the former H.I. values can conform with the latter H.I. values, and scaling up or scaling down the mixer accordingly:

$$H.I. = \frac{P_h}{\rho v_h}\frac{Q}{V}t_m \qquad \text{the Equation 1}$$
$$= \left(\frac{N_{qd}(N_p - \pi^2 \cdot N_{qd})d^8}{\pi \cdot h \cdot \delta(\delta + d) + \frac{\pi}{4}n_s dl}\right)\left(\frac{N^4 \cdot t_m}{V}\right)$$
$$= C_h\left(\frac{N^4 \cdot t_m}{V}\right)$$

In the Equation 1,
H.I: Homogenization Index [m²/s³]
ρ: Concentration [kg/m³]

vh : Volume of the Gap [m$^3$]
P$_h$: Power Consumption [W]
Q: Flow Rate [m$^3$/s]
t$_m$: Mixing Time [s]
V: Fluid being Processed [m$^3$]
N$_p$: Number of Powers [-]
N$_{qd}$: Number of Flow Rates [-]
h: Height of Stator [m]
d: Diameter of Hole of Stator [m]
n$_s$: Number of Holes of Stator [-]
l: Thickness of Stator [m]
σ: Gap between Rotor and Stator [m]
N: Number of Rotations [1/s]
C$_n$: Configuration Dependent Term for Gap [m$^5$].

7. A method for manufacturing foods, pharmaceutical medicines or chemical products having desired drop diameters by subjecting a fluid being processed to an emulsification, dispersion, drop breakup or mixing process using a mixer of a rotor-rotor type which comprises a mixer unit that includes a stator having a plurality of openings (holes) and a rotor disposed inside the stator and spaced by a particular gap away from the stator, wherein the method includes the steps of: using the Equation 1 given below, and calculating the mixer running time and a drop diameter thus obtained during the mixer running time for the fluid being processed:

$$H.I. = \frac{P_h}{\rho v_h} \frac{Q}{V} t_m \quad \text{the Equation 1}$$

$$= \left( \frac{N_{qd}(N_p - \pi^2 \cdot N_{qd})d^8}{\pi \cdot h \cdot \delta(\delta + d) + \frac{\pi}{4} n_s dl} \right) \left( \frac{N^4 \cdot t_m}{V} \right)$$

$$= C_h \left( \frac{N^4 \cdot t_m}{V} \right)$$

In the Equation 1,
H.I: Homogenization Index [m$^2$/s$^3$]
ρ: Concentration [kg/m$^3$]
vh: Volume of the Gap [m$^3$]
P$_h$: Power Consumption [W]
Q: Flow Rate [m$^3$/s]
t$_m$: Mixing Time [s]
V: Fluid being Processed [m$^3$]
N$_p$: Number of Powers [-]
N$_{qd}$: Number of Flow Rates [-]
h: Height of Stator [m]
d: Diameter of Hole of Stator [m]
n$_s$: Number of Holes of Stator [-]
l: Thickness of Stator [m]
σ: Gap between Rotor and Stator [m]
N: Number of Rotations [1/s]
C$_n$: Configuration Dependent Term for Gap [m$^5$].

8. A method for manufacturing a mixer of the stator-rotor type comprising a mixer unit that includes a stator having a plurality of openings (holes) and a rotor disposed on the inner side of the stator and spaced by a particular gap away from the stator, the mixer having a construction that is designed by using the Equation 1 given below in such a manner that a particular mixer running time and a particular drop diameter during the particular mixer running time can be obtained when a fluid being processed is subjected to an emulsification, dispersion, particle size breakup or mixing process and by calculating the particular mixer running time and a resulting drop diameter by using the Equation 1:

$$H.I. = \frac{P_h}{\rho v_h} \frac{Q}{V} t_m \quad \text{the Equation 1}$$

$$= \left( \frac{N_{qd}(N_p - \pi^2 \cdot N_{qd})d^8}{\pi \cdot h \cdot \delta(\delta + d) + \frac{\pi}{4} n_s dl} \right) \left( \frac{N^4 \cdot t_m}{V} \right)$$

$$= C_h \left( \frac{N^4 \cdot t_m}{V} \right)$$

In the Equation 1,
H.I: Homogenization Index [m$^2$/s$^3$]
ρ: Concentration [kg/m$^3$]
vh: Volume of the Gap [m$^3$]
P$_h$: Power Consumption [W]
Q: Flow Rate [m$^3$/s]
t$_m$: Mixing Time [s]
V: Fluid being Processed [m$^3$]
N$_p$: Number of Powers [-]
N$_{qd}$: Number of Flow Rates [-]
h: Height of Stator [m]
d: Diameter of Hole of Stator [m]
n$_s$: Number of Holes of Stator [-]
l: Thickness of Stator [m]
σ: Gap between Rotor and Stator [m]
N: Number of Rotations [1/s]
C$_n$: Configuration Depending Term for Gap [m$^5$].

9. The method for manufacturing the mixer as defined in claim 8, wherein the stator and rotor are arranged in such a manner that they can be moving closer to each other and moving farther away from each other in a direction in which a rotary shaft of the rotor extends.

10. The method for manufacturing the mixer as defined in claim 8, wherein the mixer includes a plurality of stators each having a different diameter and a rotor disposed on the inner side of each of the stators and spaced by a particular gap away from said each stator.

11. The method for manufacturing the mixer as defined in claim 10, wherein the fluid being processed is introduced into the gap between each of the stators and the rotor disposed on the inner side of each of the stators and spaced by the particular gap away from said each stator.

12. The method for manufacturing the mixer as defined in claim 8, wherein the rotor includes a plurality of agitating blades extending radially from a center of rotation of the rotor.

* * * * *